R. E. WILLIAMS.
REGULATING BRACKET FOR MOVABLE LIGHTS.
APPLICATION FILED APR. 7, 1920.
1,430,135.
Patented Sept. 26, 1922.
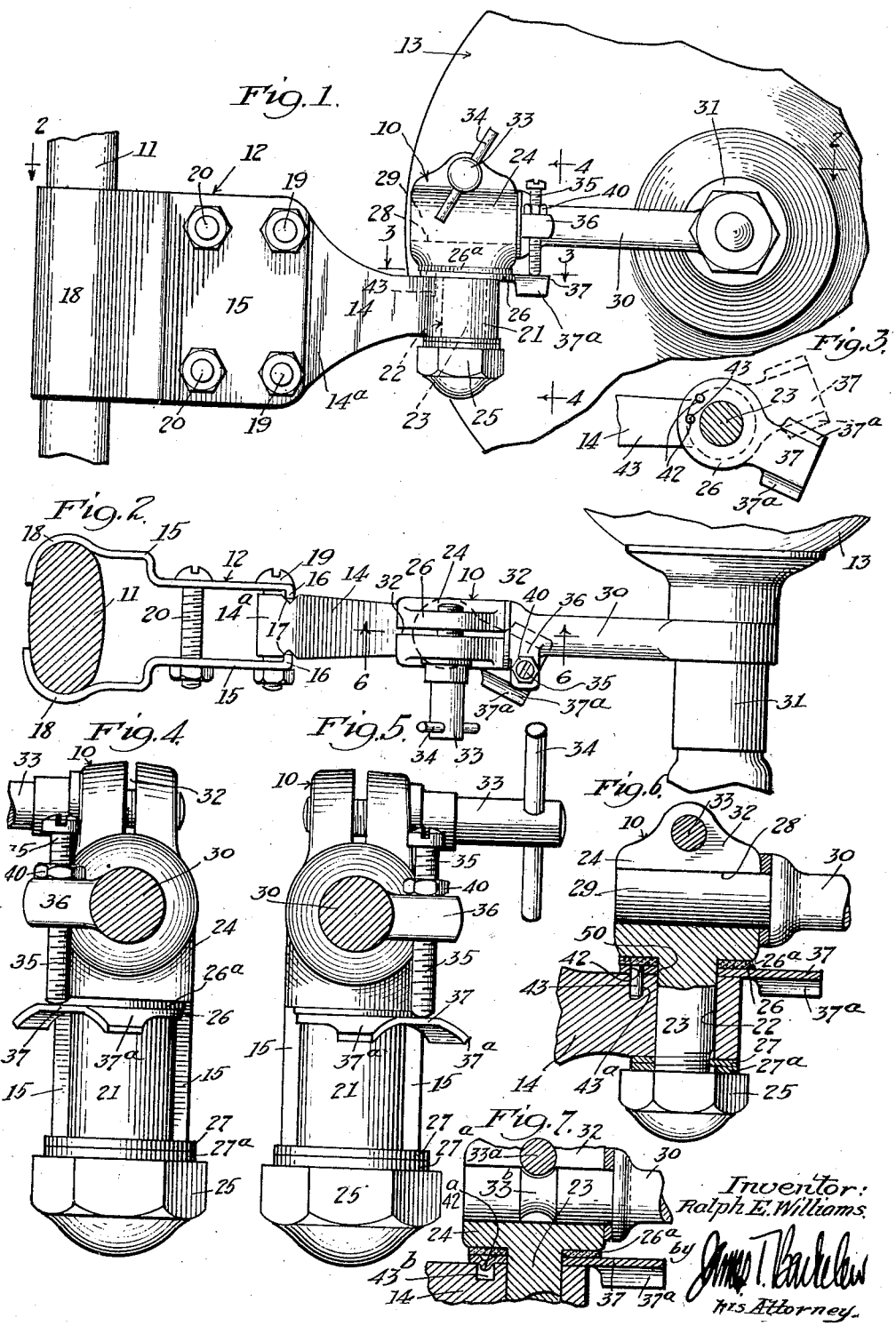
Inventor:
Ralph E. Williams.
by
his Attorney.

Patented Sept. 26, 1922.

1,430,135

UNITED STATES PATENT OFFICE.

RALPH E. WILLIAMS, OF LOS ANGELES, CALIFORNIA.

REGULATING BRACKET FOR MOVABLE LIGHTS.

Application filed April 7, 1920. Serial No. 372,042.

*To all whom it may concern:*

Be it known that I, RALPH E. WILLIAMS, a citizen of the United States, residing at Los Angeles, in the county of Los Angeles, State of California, have invented new and useful Improvements in Regulating Brackets for Movable Lights, of which the following is a specification.

This invention relates to regulating brackets for movable lights and more specifically to brackets for mounting spotlights on windshield standards, or like members, so that their upward movement when facing forward may be regulated. An object of the invention is to provide a bracket of this character which is simple, effective and particularly inexpensive to manufacture.

The bracket provided by the present invention is adapted to support a light, particularly a spotlight so that its upward movement when facing forward can be regulated or limited, so that the spotlight can be manipulated to release the regulating or limiting means thereby allowing unlimited movement of the spotlight, and so that the spotlight can be easily and quickly completely detached from the bracket.

A feature of the bracket provided by the invention is its construction and arrangement by which it is rendered simple and convenient in operation, effective, and particularly inexpensive to manufacture. The construction of the bracket is such as to minimize the amount of material required in its manufacture, make the finishing and handling of the various parts simple and convenient, and make its cost of manufacture particularly low.

Further objects and features of the invention will be readily understood from the following detailed description of a preferred embodiment of the invention throughout which reference is had to the accompanying drawings, in which—

Fig. 1 is a side elevation of the bracket provided by the invention showing it supporting a spotlight on a windshield standard; Fig. 2 is a plan view of the bracket being a view taken as indicated by line 2—2 on Fig. 1; Fig. 3 is a detail section taken as indicated by line 3—3 on Fig. 1; Fig. 4 is an enlarged view taken as indicated by line 4—4 on Fig. 1; Fig. 5 is a view similar to Fig. 4 showing the bracket arranged on the left-hand side of a machine; Fig. 6 is an enlarged detail section taken as indicated by line 6—6 on Fig. 2; and Fig. 7 is a sectional view similar to Fig. 6 showing another form of construction.

Throughout the drawings numeral 10 designates the bracket, provided by the present invention, which is secured to the windshield standard 11 by a suitable clamp 12 and which supports the spotlight 13. In the particular form of construction shown in the drawings the bracket 10 and clamp 12 are combined or incorporated so that the arm 14 forms the body of the clamp 12 and also a part of the bracket structure. The clamp 12 herein set forth in connection with the bracket 10 is merely a typical clamp which may be used in connection with the bracket and does not in any way limit the invention to embodiment or use in connection with a clamp of this particular design or construction.

The clamp 12 comprises two clamp jaws 15 having inwardly extending flanges 16, at their inner edges, which engage grooves 17 in the widened end portion 14$^a$ of the arm 14. The outer portion 18 of the clamp jaws 15 are curved to conform with the windshield standard 11 and the jaws are connected or held to the arm 14 by suitable bolts 19. The clamp jaws 15 are adapted to be clamped onto the windshield standard 11 by suitable bolts 20 which extend between the clamp jaws 15 at points suitably spaced from the points at which the flanges 16 engage the grooves 17, as clearly shown in Fig. 2. The particular details of the clamp 12 are set forth in my co-pending application entitled "Brackets," Serial No. 372,041, filed April 7, 1920, which is directed specifically to the clamp.

The outer end 21 of the arm 14 is somewhat enlarged, flat at its top and bottom, and provided with a vertical bore 22. The outer end 21 of the arm 14 being formed in this manner provides a socket adapted to carry the trunnion 23 which extends vertically from the socket 24. The trunnion 23 extends vertically through the bore 22, in the end portion 21, and has screw threaded on its lower end a suitable nut 25 which prevents displacement of the trunnion from the bore. A plate 26 and a friction washer 26$^a$ preferably fibre, are carried on the trunnion 23 between the top of the end portion 21 and the bottom of the socket 24 while washers 27 and 27$^a$ are interposed between the nut 25 and the bottom of the end portion 21, as clearly illustrated in Figs. 1 and 6 of the drawings. Washer 27 is a friction washer, preferably fibre, and the washer 27ª is a lock washer which prevents the nut 25 from working off of the trunnion 23. In practice, the nut 25 is preferably tightened on the end of the trunnion 23 until the trunnion will not move in the bore 21 due to vibration or jarring of the machine but so that it can be rotated or adjusted in the bore 21 by hand.

The socket 24, carried on the trunnion 23, has a horizontal bore 28 in which is carried trunnion 29 formed on the ends of the arm 30 which extends from the body 31 of the spotlight 13. The socket 24 is split at 32 and is provided with a clamping bolt 33 so that it may be tightened or clamped on the trunnion 29. It will be understood how the clamping bolt 33 makes it possible to tighten the socket 24 on the trunnion to lock it in a set position, or how it may be tightened sufficiently to prevent movement of the trunnion due to vibration of the machine at the same time allowing it to be moved by hand. The bolt 33, it will be noted, is provided with a suitable cross bar or handle 34 by which it may be easily and conveniently operated. It will be readily understood how the construction herein so far described permits of the spotlight 13 being adjusted from side to side, or about a vertical axis, and up and down, or about a horizontal axis. And further, it will be understood, how the lamp 13 may be readily detached from the bracket 10 by releasing the bolt 33 and removing the trunnion 29 from the bore 28.

The regulating or limiting means, by which the spotlight is limited in its upward movement when facing forward, comprises a set screw 35 carried in a lug 36, formed on the arm 30, so as to engage projection 37 which extends from the plate 26. The lug 36 is preferably formed integral with the arm 30 and at the outer end of the arm as shown throughout the drawings. The projection 37 which extends from the plate 26 is preferably shaped substantially as shown in Fig. 4 of the drawings, so that it will be engaged by the set screw 35 when the lamp is facing forward and turned upwardly. Flanges 37ª extend outwardly and downwardly from the sides of the projection 37 and act as guides to direct the set screw 35 onto the projection 37 when the spotlight is being turned into its normal (forward) position after having been turned or manipulated to shine in various directions, such as from side to side, etc., and slightly up. It will be readily understood how the set screw 35 may be regulated in the lug 36 so as to engage the projection 37 when the spotlight has been moved upwardly to the desired position. In practice, it is preferred that the set screw 35 be adjusted in the lugs 36, and locked or set by the lock nut 40, so that the spotlight can not be turned upwardly sufficient to shine into the eyes of oncoming motorists, at the same time allowing it to be directed onto the road ahead of the machine.

The plate 26, of which the projection 37 forms an integral part, is preferably stamped or otherwise suitably formed from sheet metal. The main portion of the plate 26 is round and has a central aperture 50 through which the trunnion 23 extends. Two smaller apertures 42 are also provided in the main portion of the plate 26. The apertures 42 are so arranged that when the plate is in position for a right hand mounting as shown in Figs. 1, 2, 3, 4 and 6, one of the apertures is engaged by pin 43 and when the plate is in position for a left hand mounting, as shown in Fig. 5, the other aperture is engaged by the pin 43. The pin 43 when in place in one of the apertures 42 prevents the plate from rotating or turning on the trunnion 23 and thereby prevents the projection 37 from becoming displaced. The pin 43 is preferably permanently mounted in the arm 14 by being made to fit tightly in a bore 43ª in the arm. When the bracket is assembled the plate can not lift off of the pin 43 due to its being firmly held between the socket 24 and the arm 14.

In Fig. 7 is shown a form of construction that may be used in place of that just described. The plate 26 may be held in place, or prevented from turning, by a projection 42ª, formed in the plate, engaging a recess or bore 43ᵇ in the arm 14. It will be understood how projections 42ª may be arranged in the same manner as the apertures 42 in the form first described.

It will be readily understood how the plate 26 may be stamped or formed from sheet metal and further it will be readily understood how the plate 26 may be shifted or suitably set, when it is desired to change the spotlight 13 from one side of the machine to the other. Fig. 6 and the dotted lines in Fig. 3 clearly illustrate the position of the projection 37 when the plate 26 is arranged for a left hand mounting. The plate 26 is particularly simple and inexpensive to manufacture and due to its reversibility the same plate suffices for either a left-hand or a right-hand mounting or bracket. It being possible to reverse the plate it is unnecessary to furnish or make the plate 26 in "rights" or "lefts." Further, the design and arrangement of the bracket is such that it is unnecessary to provide any other part or parts of the bracket in "rights" and "lefts" in order to make the bracket either right-handed or left-handed. These are particularly important features as they make the bracket extremely inexpensive to manufacture and of great commercial value.

In Fig. 7 I also show the clamp screw 33ª set low enough to engage a groove 33ᵇ in trunnion 29 to prevent removal of the trunnion unless the clamp screw is entirely removed.

It will be understood that plate 37 may be made of any suitable extent to control the lamp through any desired horizontal angle; and also that parts 37ª may be omitted if desired.

Having described a preferred form of my invention, I claim:

1. A lamp mounting comprising a stationary member forming a clamp body and a socket, a socket member having a trunnion rotatably carried in the socket formed by the stationary member, a lamp carrying member rotatably carried in the socket member, a projection formed on the lamp carrying member, a member carried on the trunnion of the socket member and between the socket member and the stationary member, a pin extending from the stationary member to engage the member carried on the trunnion to hold it against movement relative to the stationary member, and a projection on the member carried on the trunnion adapted to co-operate with the projection on the lamp carrying member to limit the rotary movement of the lamp carrying member in the socket.

2. A lamp mounting comprising a stationary member, a socket pivotally carried by the stationary member, a lamp carrying member rotatably carried in the socket, a limiting stop on the lamp carrying member, a member in connection with the stationary member and the socket, means for locking said member to the stationary member against relative movement therewith, said means comprising a projection extending from one of the members to engage an aperture in the other, and a projection extending from said member and adapted to be engaged by the limiting stop to limit the rotary movement of the lamp carrying member in the socket.

3. A lamp mounting comprising a stationary member forming a clamp body and a socket, a socket member having a trunnion rotatably carried in the socket formed by the stationary member, a lamp carrying member rotatably carried in the socket member, a projection formed on the lamp carrying member, a member carried on the trunnion of the socket member and between the socket member and the stationary member, means in connection with said member to hold it against movement relative to the stationary member, said means comprising a projection extending from one of the members to engage an aperture in the other, and a projection on said member adapted to co-operate with the projection on the lamp carrying member to limit the rotary movement of the lamp carrying member in the socket, the projection having outwardly and downwardly extending flanges at its sides.

4. A lamp mounting comprising a stationary member forming a clamp body, having a projection, and forming a socket, a socket member having a trunnion rotatably carried in the socket formed by the stationary member, a lamp carrying member rotatably carried in the socket member, a projection formed on the lamp carrying member, a reversible stop member carried on the trunnion of the socket member and between the socket member and the stationary member, said member having in it two apertures either one of which is adapted to co-operate with the projection on the stationary member to prevent movement of said stop member.

5. A lamp mounting of the character described comprising, a stationary member having a projection, and forming a clamp body and a socket, a socket member having a trunnion pivotally carried in the socket formed by the stationary member, a lamp carrying member rotatably carried in the socket member, an adjustable limiting stop on the lamp carrying member, a reversible member mounted on the trunnion and interposed between the socket member and the stationary member, said member having in it two apertures, either one of which is adapted to co-operate with the projection on the stationary member to prevent movement of said member relative to the stationary member, a stop forming projection extending from said member, and outwardly and downwardly extending flanges at the edges of said stop forming projection.

In witness that I claim the foregoing I have hereunto subscribed my name this 24th day of March, 1920.

RALPH E. WILLIAMS.

Witness:
VIRGINIA BERINGER.